United States Patent
Komai et al.

(10) Patent No.: US 6,475,597 B2
(45) Date of Patent: *Nov. 5, 2002

(54) THERMOPLASTIC RESIN-COATED ALUMINUM ALLOY PLATE AND METHOD AND APPARATUS FOR MANUFACTURING THE SAME

(75) Inventors: Masao Komai, Yamaguchi-ken (JP); Ayumu Taniguchi, Tokyo (JP); Keiichi Shimizu, Yamaguchi-ken (JP); Jun-ichi Tanabe, Yamaguchi-ken (JP)

(73) Assignee: Toyo Kohan Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/125,706

(22) PCT Filed: Feb. 21, 1997

(86) PCT No.: PCT/JP97/00497
§ 371 (c)(1),
(2), (4) Date: Apr. 29, 1999

(87) PCT Pub. No.: WO97/30846
PCT Pub. Date: Aug. 28, 1997

(65) Prior Publication Data
US 2001/0051278 A1 Dec. 13, 2001

(30) Foreign Application Priority Data
Feb. 23, 1996 (JP) .................................. 08-060320

(51) Int. Cl.⁷ .................................. B32B 15/08
(52) U.S. Cl. .................. 428/141; 428/332; 428/458
(58) Field of Search .................. 428/457, 458, 428/142, 412, 480, 141, 35.8, 35.9, 332; 156/153, 281; 118/72, 73; 148/437; 427/209, 211, 290, 292, 307, 309, 314, 315, 318, 327, 330, 435, 444; 525/433, 466

(56) References Cited

U.S. PATENT DOCUMENTS

| | | | | |
|---|---|---|---|---|
| 3,275,562 A | * | 9/1966 | Smith .......................... 510/255 |
| 3,776,782 A | * | 12/1973 | Kiefer et al. ................ 428/458 |
| 3,898,095 A | * | 8/1975 | Berdan et al. .................. 134/3 |
| 4,028,205 A | * | 6/1977 | Dorsey, Jr. ................... 204/488 |
| 4,085,012 A | * | 4/1978 | Marceau et al. ............ 156/151 |
| 4,422,886 A | * | 12/1983 | Das et al. ................. 428/472.2 |
| 4,535,901 A | * | 8/1985 | Okudaira et al. .......... 215/12.2 |
| 5,302,429 A | * | 4/1994 | Memon ....................... 428/35.7 |
| 5,585,177 A | * | 12/1996 | Okamura et al. ........... 428/341 |
| 5,807,430 A | * | 9/1998 | Zheng et al. .......... 106/287.11 |
| 5,840,467 A | * | 11/1998 | Kitatani et al. ............. 430/302 |
| 6,099,953 A | * | 8/2000 | Komai et al. ............. 428/312.8 |
| 6,238,783 B1 | * | 5/2001 | Komai et al. ............. 428/307.3 |

FOREIGN PATENT DOCUMENTS

| | | |
|---|---|---|
| JP | 344496 | 2/1991 |
| JP | 677967 | 5/1994 |
| JP | 6122172 | 5/1994 |
| JP | 6267638 | 9/1994 |
| JP | 6272015 | 9/1994 |

* cited by examiner

Primary Examiner—Stevan A. Resan
Assistant Examiner—Kevin M Bernatz
(74) Attorney, Agent, or Firm—Browdy and Neimark, P.L.L.C.

(57) ABSTRACT

The present invention aims to offer thermoplastic resin coated aluminum alloy sheet having excellent adhesion after forming, wherein the laminated thermoplastic resin layer will not peel off even when subjected to such severe forming as drawing, followed by stretch-forming, further followed by ironing. In order to achieve this, aluminum alloy sheet is treated with alkali solution by dipping into or spraying alkali solution, rinsed, treated with acid solution by dipping into or spraying acid solution so as to obtain a specific surface condition, and further laminated with thermoplastic resin with or without adhesive on both sides of the aluminum alloy sheet.

3 Claims, No Drawings

THERMOPLASTIC RESIN-COATED ALUMINUM ALLOY PLATE AND METHOD AND APPARATUS FOR MANUFACTURING THE SAME

TECHNOLOGICAL FIELD

The present invention relates to a thermoplastic resin coated aluminum alloy sheet, suitable for use in severe forming conditions, manufacturing method thereof, and manufacturing device thereof. More specifically, it relates to thermoplastic resin coated aluminum alloy sheet for use in can which can withstand severe forming conditions, intended to be formed into not only a can lid or a drawn can, but also for a drawn and ironed can, a drawn and stretch-formed can, a drawn, stretched and ironed can and such, manufacturing method thereof and manufacturing device thereof.

BACKGROUND TECHNOLOGY

Aluminum alloy sheet which is laminated with thermoplastic resin, for instance, polyester resin, is already being used for can lid and such. However, if the adhesion of the laminated thermoplastic resin layer to the aluminum alloy sheet is insufficient, the thermoplastic resin layer might peel off during the forming, or corrosion might progress from the part where adhesion is insufficient. This adhesion after forming is greatly influenced by the surface condition of the aluminum alloy sheet in addition to the formability of the aluminum alloy sheet and the characteristics of the laminated thermoplastic resin layer. Thus, in order to improve the adhesion of the thermoplastic resin layer or the coating film to the aluminum alloy sheet, the following surface treatments are conventionally given to the aluminum alloy sheet.
(1) Method of giving chemical treatment such as phosphorus acid treatment or chromic acid treatment to the aluminum alloy sheet.
(2) Method of coating thermosetting resin primer on one side of the thermoplastic resin film or aluminum alloy sheet.
(3) Method of forming an anodic oxide film with minute pores, having diameter of 200 angstrom or more and pore depth of 5 μm or less, on the surface of the aluminum alloy sheet, using a solution containing chromic acid (Japanese laid open publication Hei 3-44496).
(4) Method of forming an oxide film of 20 angstrom or more on the aluminum alloy sheet by heating said sheet in atmosphere for two hours or more in temperature range of 250–650° C. after said aluminum alloy sheet is cleaned. (Japanese laid open publication Hei 6-272015).
(5) Method wherein after the aluminum alloy sheet is cleaned, it is electrolytically treated using oscillating current in an alkali solution and an oxide film, having a thickness of 500 to 5000 angstrom and ramified micro pores is formed on the aluminum alloy sheet (Japanese laid open publication Hei 6-267638).

In the method of the chemical treatment such as phosphorus acid treatment or the chromic acid treatment of method (1) phosphate, chromate, or fluorine compound, and such, are mainly used for the treating solution. The thus formed chemical treatment film is effective in the improvement of adhesion and generally used. However, enormous facility for waste water treatment is needed for draining of the treating solution in order to prevent environmental pollution. Therefore, such chemical treatments are undesirable from the viewpoint of environmental protection. The method of coating a primer for adhesion of method (2) increases the cost by coating the primer and requires a surplus process for baking the coating as well, and is not desirable from the viewpoint of productivity. Furthermore, it needs an exhaust processing equipment to dispose of the organic solvent. As for the method of forming the anodic oxide film having pores of a specific diameter and depth by the use of chromic acid solution of method (3), it is not desirable from the viewpoint of productivity since the anodic oxide film requires a long time to be formed. Also the thermoplastic resin layers might peel off when subjected to severe forming processing. Moreover, it requires a facility for waste water treatment for environmental pollution prevention. As for method (4), in which the aluminum alloy sheet is heated for a long time in the atmosphere to form an oxide film thereon, the thermoplastic resin layer peels off when subjected to severe forming, like Method (3). It further requires along time to form the oxide film and is not desirable from the viewpoint of productivity. The method (5), in which an oxide film of 500 to 5000 angstrom is formed by electrolytical treatment using oscillating current in an alkali solution, enables continuous surface treatment in a short period of time by electrolysis and is effective in the adhesion of the laminated resin film. However, after the resin film is laminated, said laminated resin film peels off when subjected to such severe forming as drawing, followed by stretch-forming and further ironing. Therefore, adhesion after forming is far from sufficient and cannot endure severe forming.

DISCLOSURE OF THE INVENTION

The technical object which the present invention aims to achieve is to provide a thermoplastic resin coated aluminum alloy sheet, of which the thermoplastic resin layer has excellent adhesion after forming and does not peel off even in further severe forming, compared to the above-mentioned, conventionally surface-treated aluminum alloy sheet, the manufacturing method and the manufacturing device thereof. Concretely, it is to provide a thermoplastic resin coated aluminum alloy sheet having excellent adhesion after forming, in which the thermoplastic resin layer does not peel off ever when subjected to deep drawing followed by stretch-forming and further followed by ironing and to provide a manufacturing method thereof and manufacturing device thereof which are cost-effective, environment-friendly and enable rapid production.

The thermoplastic resin coated aluminum alloy sheet of the present invention is characterized in that at least one side of an aluminum alloy sheet having comparative surface area increase rate of 3–30% is covered with thermoplastic resin.

Said aluminum alloy sheet has minute pores formed on the surface. The minute pores have preferably an average diameter of 50 to 3000 nm, maximum depth of 1000 nm or less, and the duty area rate of 10 to 90%. Moreover, it is more preferable that the average diameter is 200 to 900 nm and the depth is shallower than half of the diameter and that the pores are formed in the thickness direction of the aluminum alloy surface.

Moreover, it is preferable that the thermoplastic resin is polyethylene terephthalate, copolyester resin mainly composed of ethylene terephthalate unit, polyester resin mainly composed of butylene terephthalate unit and compound resin of polyester resins blended and/or multi-layered.

In addition, it is preferable that the polyester resin layer to be laminated is a multi-layered resin comprising an upper layer and a lower layer of polyester resin, and an intermediate layer of blended resin in which bis-phenol A carbonate is blended to polyester resin or bisphenol A polycarbonate.

The method of manufacturing the thermoplastic resin coated aluminum alloy sheet of the present invention is characterized in that an aluminum alloy strip is continuously treated in an alkaline aqueous solution, rinsed with water, treated in acid aqueous solution, rinsed with water, dried, and after that covered with thermoplastic resin.

It is preferable that the alkali aqueous solution is an aqueous solution having as the main component of one or more than one compound selected from the group of hydroxide, hydroxide, carbonate, bicarbonate, silicate, and borate of alkali metal or ammonium in quantity of 10 to 200 gm/l.

Moreover, the above-mentioned acid solution preferably has as the main component 10 to 300 g/l of one or more than two types selected from sulfuric acid, nitric acid, hydrochloric acid, and phosphoric acid.

In addition, it is preferable that the treatment with alkali aqueous solution is spraying treatment or the dipping treatment in the alkali aqueous solution, and that the treatment with the acid aqueous solution is spraying treatment or dipping treatment in the acid aqueous solution.

The manufacturing device of the thermoplastic resin coated aluminum alloy sheet of the present invention is characterized in that tanks for the alkali aqueous solution treatment, rinsing, acid aqueous solution treatment, rinsing, a drying device, and laminating device for the thermoplastic resin are serially placed next to each other.

THE BEST MODE OF CARRYING OUT THE INVENTION

An aluminum alloy sheet is dipped in the alkali aqueous solution such as sodium hydroxide or the alkali aqueous solution is sprayed. After rinsing, said sheet is dipped in acid aqueous solution such as sulfuric acid or the acid aqueous solution is sprayed, and thus the surface of the aluminum alloy sheet is adjusted to a specific condition. After, it is rinsed, dried, and heated to a temperature higher than the melting point of thermoplastic resin to be laminated, thermoplastic resin is laminated on both sides of it by heat bonding. A thermoplastic resin coated aluminum alloy sheet having excellent adhesion after forming, of which the laminated thermoplastic resin layer will not peel off even after severe forming such as deep-drawing followed by stretch-forming, further followed by ironing, is obtained by a simple and inexpensive method as mentioned above.

The present invention is explained further in detail as follows: First of all, the aluminum alloy sheet to be used in the present invention is not especially limited as long as it can endure severe forming such as deep-drawing, followed by stretch-forming, further followed by ironing, which is the object of the present invention. However, from the viewpoint of cost and formability, aluminum alloy sheet of JIS 3000 series and JIS 5000 series with thickness of 0.20 to 0.35 MM, which is widely used for cans, is preferable. Since the aluminum alloy sheet to be used in the present invention is formed after thermoplastic resin is laminated, it is not necessary to consider the solid lubrication of the surface, as is the case in drawn and ironed can. The sheet may be selected considering formability, etchability, or adhesion after forming with the thermoplastic resin to be laminated.

Next, the surface condition of the aluminum alloy sheet is explained. The surface condition formed on the surface of the aluminum alloy sheet of the present invitation by alkali aqueous solution treatment, followed by acid aqueous solution treatment, may be specified by the measurement with an atomic force microscope, for instance. Concretely, five arbitrary points on the surface of the aluminum alloy sheet, treated by the alkali aqueous solution treatment followed by acid aqueous solution treatment, are measured. If the specific area increase rate is in the range of 3 to 30%, more preferably 4 to 20%, the object of the present invention, an aluminum alloy sheet having excellent adhesion after forming, that is the object of the present invention, wherein the laminated thermoplastic resin layer will not peel off even when subjected to severe forming, can be obtained. It is especially preferable that the average diameter of the formed minute pores is in the range of 50 nm to 3000 nm and the maximum depth is 1000 nm or less, and the duty area rate of the pores is in the range of 10 to 80%. It is even more preferable that the average diameter on the pores is in the range of 50 to 1000 nm, the maximum depth is 600 nm or less, and the occupation area rate of the duty area rate of the pores is 20–80%.

In the adhesion after forming of the laminated thermoplastic resin layer the with the aluminum alloy sheet, the surface condition of the aluminum alloy sheet is very important. The conventional method for surface roughening generally performed such as mechanical roughening or electrolytic etching is effective in the adhesion after forming of the thermoplastic resin layer to be laminated. However, laminated thermoplastic resin layer peels off when severe forming, which is the purpose of the present invention, is given. Although the cause of this peel-off is not clearly known, it is supposed that the thermally melted thermoplastic resin dose not sufficiently penetrate into the dented portions of the roughness of the aluminum alloy sheet, that is, the anchor effect is not enough.

In the present invention, it is supposed that when the specific surface area increase rate is in the range of 3 to 30%, on the surface of the aluminum alloy sheet, and it has duty area rate of pores of 10 to 80%, with minute pores of which the average diameter is 50–3000 nm and the maximum depth of 1000 nm or less, and more preferably specific surface area increase rate by 3 to 30%, duty area rate of pores of 20–80%, average diameter of 50–1000 nm, and maximum depth of 600 nm or less, the thermally melted thermoplastic resin sufficiently penetrates into the dented portions formed on the surface of the aluminum alloy sheet and enough anchor effect is obtained. That is, it has been shown that as the surface condition of the aluminum alloy sheet which comes into direct contact with the thermoplastic resin layer, one with specific surface area has excellent adhesion with the laminated thermoplastic resin layer.

The surface area in this context differs from the conventional concept of the surface roughness and such measured by the stylus examination method. It is similar to the concept of the so-called surface activation degree, or the surface area of a surface condition where ultra minute ruggedness of nanometer order is formed.

The specific surface area increase rate mentioned in the claims of the present invention was given as follows: the ratio (specific surface area) of the area measured in a sample of the present invention (real area) to that of the sample tentatively having no ruggedness (projected area) was measured and the increment was expressed by percentage. As for the actual measurement, an area of 5 $\mu$m square of the surface of the sample was measured with 512 pixels (the number of pixels) per line by an atomic force microscope "Nano scope IIIa" manufactured by Digital Instruments Inc,. The measurement was practiced on 5 different visual fields. The average was defined as the actual surface area (numerator) A. The projected area (denominator=standard) B of the measured field which was assumed to be entirely flat was also determined. The increment of the ratio of A to B was calculated. After that, specific surface area increase rate C was defined as $C\% = (A/B - 1) \times 100$.

In the present invention, it was found that when the thus measured specific surface area increase rate of the aluminum alloy sheet was in the range of 3–30%, preferably in the range of 4–20%, the adhesion after forming with the laminated thermoplastic resin layer was remarkably improved and the excellent adhesion after forming which endures severe forming could be obtained. When the specific surface area increase rate is 3% or less, almost no effect is observed on the adhesion after forming, whereas when it is 30% or more, the maximum depth of the formed minute pores becomes remarkably deep, which causes undesired effects on the adhesion It was mentioned earlier that in the present invention, it is preferable to define the above mentioned specific surface area increase rate as well as the average diameter and the maximum depth of the formed minute pores and its duty area rate into the specified range. The reason for this definition is the same as that in the case of specific surface area increase rate. That is, when the average diameter of the pore is 50 nm or less and the duty area rate of pores is 10% or less, it does not affect the adhesion after forming of the thermoplastic resin layer, whereas when the average diameter exceeds 3000 nm, the maximum depth exceeds 1000 nm and the duty area rate of ores exceeds 80%, the surface becomes too rough, even in the microscopic observation. It causes an insufficient anchoring effect, which has fear for decreasing the adhesion after forming, since the melted thermoplastic resin does not sufficiently penetrate into the dented portions. It is not preferable.

Next, the method of manufacturing the thermoplastic resin coated aluminum alloy sheet of the present invention is explained. First, aqueous solution mainly composed of one or more than one kind of compound of hydroxide, carbonate, bicarbonate, phosphate, silicate or borate of alkali metal or ammonium, or borate of alkali metal or ammonium, or these alkali solutions containing a surface active agent is used for the treatment by alkali aqueous solution. The main purposes for treating with the alkali aqueous solution are to melt and remove the oxide film formed on the surface of the aluminum alloy sheet and to remove the oil adhered to the surface of the aluminum alloy sheet. The surface might be occasionally somewhat etched. The addition of the surface active agent is preferably done to improve the wettability and the degreasing ability of the aluminum alloy sheet with the alkali aqueous solution. As for the concentration of the compound used, the range of 10–200 g/l is preferable, and the range of 30–1000 g/l is more preferable. The temperature of the alkali aqueous solution is preferably in the range of 30–80° C., and more preferably in the range of 45–60° C. As for the treatment method, the aluminum alloy sheet is dipped in the alkali aqueous solution or in an alkali aqueous solution with the surface active agent added or it is sprayed with this alkali aqueous solution. A short duration of treatment of 1–30 seconds is enough, and the range of 3–15 seconds is more preferable. Although direct current electrolysis or alternating current electrolysis in the alkali aqueous solution may be thought of, these methods require electrolysis facility, and it is not favorable from the viewpoint of cost. When the concentration of the alkali compound is 10 g/l or less, or the temperature of the alkali aqueous solution is below 30° C., it takes a long time to remove the adhered oil and the oxide film on the surface of the aluminum alloy sheet, hindering the continuous productivity of the thermoplastic resin coated aluminum alloy sheet of the present invention, and it is not preferable. When the concentration of the alkali compound exceeds 200 g/l and the temperature of the alkali is above 80° C., it is not only undesirable from the viewpoint of cost, but it is uneconomical since dissolving of the aluminum alloy surface is promoted although the oil and the oxide film existing on the aluminum alloy surface is easily removed, that is also unfavorable. Local etching may be caused at times, and the aluminum alloy sheet having the surface condition required for the present invention might not be obtained and it is undesirable. In general, in case of the treatment using an alkali aqueous solution of high concentration at a high temperature, the treatment is sufficiently achieved in a short duration, whereas in case of the treatment using an alkali aqueous solution of low concentration at a low temperature, it takes a long duration. In the present invention, the concentration and the temperature of the alkali aqueous solution, and the duration of treatment time are properly selected within a specified range.

Next, the treatment with acid aqueous solution given after rinsing is explained. It is desirable for the treatment with the acid aqueous solution to use mainly composed of one or more than one type of acid selected from sulfuric acid, nitric acid, hydrochloric acid and phosphoric acid. Carboxylic acid and oxicarboxylic acid are also available for the acid treatment of the present invention. However, not only are they unfavorable from the viewpoint of cost, but their chemical oxygen demand (COD) is higher compared to that of the inorganic acids such as sulfuric acid and additional cost for the waste water treatment is required, and so they are not desirable. The purpose of the acid aqueous solution treatment is to remove the smut remaining on the surface, caused by the alkali aqueous treatment and to obtain a surface condition of the aluminum alloy sheet required for the present invention, having the specific surface area increase rate of 3–30%, minute pores having an average diameter of 50–3000 nm and maximum depth of 1000 nm or less, and the duty area rate of pores of 10–80% at the same time. As for the concentration of inorganic acid used, the range of 10–300 g/l is desirable, and the range of 30–150 g/l is more desirable. The temperature of the acid aqueous solution is desirably in the range of 5–60° C., and more desirably in the range of 15–40° C. As the treatment method, the aluminum alloy sheet treated with the alkali aqueous is dipped in the acid aqueous solution or sprayed by the acid aqueous solution. As for the duration of the treatment, a short duration of 1–30 seconds is enough, and the range of 3–15 seconds is more desirable. Although a longer duration of treatment will not hinder to obtain a surface condition in which the present invention is characterized, it is not suitable for the high speed, continuous production of the thermoplastic resin covered a luminum alloy sheet of the present invention. Although there is also a method of etching the surface of the aluminum alloy sheet by the direct current electrolysis or alternating current electrolysis by using this acid aqueous solution, the surface is locally etched by such electrolytic treatment, and the desired surface condition cannot be obtained. Also an electrolysis equipment is needed, and it is economically undesirable. When the concentration of the inorganic acid is 10 g/l or less or the temperature of the acid solution is below 5° C., it takes a long time to obtain a desired surface condition, resulting in the hindrance of the continuous productivity of the thermoplastic resin coated aluminum sheet of the present invention and thus is not desirable. When the concentration of the inorganic acid exceeds 200 g/l, although it will not hinder to obtain the surface condition in which the present invention is characterized, the amount of the acid solution taken out by the continuous treatment increases and therefor is economically undesirable. Moreover, with the rise of the temperature of the acid aqueous solution, not only does economical loss by heating become greater, but also the corrosivity of the facility by the generated mist increases, and therefor it is undesirable.

An aluminum alloy sheet having the desired surface condition, obtained by successive treatment with alkali aqueous solution and acid aqueous solution as mentioned above, is rinsed and dried, and followed by being laminated by a thermoplastic resin. For the lamination of the thermoplastic resin, both well-known extrusion lamination of melted resin and film lamination can be applied. Moreover, applying a combination of both methods is also possible. The film laminating method is suitable for a high speed production while the extrusion laminating method of melted resin is advantageous in cost. The selection of either method of the two should be decided considering characteristics required for its use and so on.

In the present invention, as the thermoplastic resin to be laminated on the aluminum alloy sheet, one resin selected from polyethylene, polypropylene, polyester, polyamide, polycarbonate, polyvinylchloride, polyvinylidene chloride, and acrylic resin, a copolymer of more than one of them, or a compound resin, blended of more than one of them may be used. Each of these thermoplastic resins has different characteristics such as heat resistance, corrosion resistance, formability, adhesiveness etc., and they should be selected depending on the intended use. In particular, for use where severe formability is required, for instance a can which is drawn, stretched-formed and further ironed, the following types of resins are preferably: polyester resin, especially polyethylene terephthalate resin, copolyester resin mainly composed of ethylene terephthalate unit, polyester resin mainly composed of butylene terephthalate unit and a compound resin of these resins blended. It is more preferably to use bi-axially oriented film of these resins. Furthermore, when impact resistance is required, the following resins are desirable: a compound resin blended of the above mentioned polyester resin and bisphenol A polycarbonate resin, a multi-layered resin having the above-mentioned polyester resin as the upper and lower layer and compound resin blended of the above-mentioned polyester resin and bisphenol A or bisphenol A polycarbonate resin as the intermediate layer.

Moreover, in cases where the adhesion of said thermoplastic resin to the aluminum alloy sheet is not sufficient, or a layer of thermoplastic layer alone cannot secure an enough corrosion resistance, thermosetting adhesive, for instance phenol epoxy adhesive on the surface of the aluminum alloy sheet, after that the thermoplastic resin is laminated, or a method of applying the adhesive in advance on the side to be bonded of the thermoplastic resin film will be necessary. However, the method of using an adhesive leads to an increase in cost. Moreover, measures against environmental pollution caused by an organic solvent contained in the adhesive are needed. Therefore, such adhesive should not be applied unless absolutely necessary.

The thickness of the thermoplastic resin layer to be laminated should also be defined considering the required characteristics. In general, the range of 5–50 $\mu$m is desirable and the range of 10–25 $\mu$m is more desirable. The formation of a thermoplastic resin layer of 5 $\mu$m or less significantly lowers work efficiency in both the film laminating method and the method of extrude-laminating of melted resin. It is also apt to generate pinholes and so sufficient corrosion resistance cannot be obtained. On the other hand, the formation of a thermoplastic resin layer of 50 $\mu$m or more is not economical compared to paints generally used. Moreover, in case of necessity, additives such as stabilizer, antioxidant, anti-static additives, pigments, lubricants, and corrosion inhibitor can be added to these thermoplastic resins without causing any obstruction.

The present invention is explained more in detail referring to examples and comparative examples as follows.

(EXAMPLE)

Example 1–6 and Comparative Example 1–4

As example 1–6 of the present invention and comparative example 1–4, aluminum alloy sheets (JIS 3004H19) having sheet thickness of 0.26 mm were subjected to the surface treatment under various conditions as shown in table 1, then rinsed and dried. Five arbitrary points of the thus surface treated aluminum alloy sheet were chosen, and the surface condition, that is, the average diameter of the pores, the maximum depth, the duty area rate of pores, and the surface area increase rate, were measured with an atomic force microscope, and the average value was obtained. The aluminum alloy sheets were heated to 240° C., and both sides of them were simultaneously laminated with bi-axially oriented copolyester resin film (thickness of 25 $\mu$m for the surface to be the inner surface of a can; thickness of 15 $\mu$m for the surface to be the outer surface of a can) consisting of 88 mole % of polyethylene terephthalate, 12 mole % of polyethylene iso-phthalate, and then the laminates were immediately dipped in water and quenched. After drying, approximately 50 mg/m$^2$ of paraffine wax was applied on both sides of them, and the laminates were subjected to the following forming.

First, after being punched out into a blank having a diameter of 16 mm, it was formed into a drawn can having a diameter of 100 mm. Then, it was formed into a redrawn can having a diameter of 80 mm by redrawing processing. The redrawn can was subjected to stretching and ironing simultaneously and was formed into a drawn and ironed can having a can diameter of 66 MM. This combined forming was performed according to the following conditions: The clearance between the redrawing portion and the ironing portion, that is to be the upper end portion of the can, is 20 mm. The shoulder of the redrawing die is 1.5 times the sheet thickness. The clearance between the redrawing die and the punch is 1.0 times the sheet thickness. The clearance in the ironing part is 50% of former sheet thickness. Next, the upper end portion of the can was trimmed off by a known method, and the neck-in processing and the flange processing were given. The rupturing rate of the can wall and the metallic exposure of the inner surface of the can of the thus obtained can body, and the adhesion after forming of the aluminum alloy sheet with the laminated thermoplastic resin layer were evaluated by the following standards. The results are shown in Table 2. The metallic exposure of the inner surface of the can was determined by enamel rater (ERV value) measurement method. That is, 3% brine solution is poured into the obtained can, and a stainless stick is dipped as a cathode. With the can body as an anode, the voltage of about 6.3V is charged between the two poles At this time, if the aluminum alloy sheet under the thermoplastic resin layer is exposed even slightly, a current flows between the two poles. This current value was expressed as the ERV value, and the metallic exposure in the can was evaluated.

A) Rupturing rate of the can wall.

◎: 0%

○: Less than 10%

Δ: From 10 to less than 30%

X: 30% or more

B) Metallic exposure of the inner surface of the can *** (evaluated with enamel rater value [ERV=mA])

◎: 0 to 0.05 mA

○: 0.05 to 0.5 mA

Δ: 0.5 to 5.0 mA

X: 5 mA or more

C) Adhesion after forming of the laminated resin layers (evaluated by the peeling off extent after the neck-in process)

◎: There is no peeling off at all.

○: Slightly peeled off, but there is no problem for practical use. ΔΔ: Considerably peeled off X : Peeled off at the entire upper end portion of the can Incidentally, comparative example 1 of Table 2 was treated in alkali aqueous solution after which smut having poor adhesion was remaining on the surface in the shape of cotton. Although the surface was significantly roughened, no minute pores are observed.

(Example 7–12 and Comparative Example 5–8)

As example 7–12 and comparative example 5–8, aluminum alloy sheets (JIS 5052H39) having the sheet thickness of 0.26 mm were subjected to the various surface treatments shown in Table 1, and after the treatments, the condition of the pores was measured as example 1 and such. These surface treated aluminum alloy sheets were heated to 235° C., and were laminated as follows: The surface to be the inner surface of the can was laminated with a double layered, bi-axially oriented polyester film (thickness of 10 μm), comprising an upper layer of copolyester resin of 15 μm in thickness consisting of 88 mole % of polyethylene terephthalate and 12 mole % of polyethylene iso-phthalate, and a lower layer of polyester resin composed by blending 45 weight % of copolyester resin, consisting 94 mole % polyethlene terephthalate and 6 mole % polyethylene iso-phthalate with 55 weight % of polybutylene terephthalate. The surface to be the outer surface of a can was laminated with the same bi-axially oriented film as example 1. These were laminated simultaneously, and the laminates were dipped in water and quenched. After drying, the laminates were formed under the same condition as example 1 and such. The characteristics of the thus obtained can body were evaluated according to the same method as Example 1 and such. The results are shown in Table 3.

Incidentally, comparative 5 or Table 3 was treated in alkali aqueous solution after which smut having poor adhesion remained on the surface in the shape of cotton. Although the surface is significantly roughened, no minute pinholes are observed.

Industrial Possibility

The thermoplastic resin coated aluminum alloy sheet of the present invention has excellent adhesion after forming, in which the laminated thermoplastic layer dose not peel off, even when subjected to severe forming. In addition, from the viewpoints of cost, environmental pollution prevention and high speed productivity, it is possible to be manufactured in an excellent method and therefore has extremely great industrial merit.

TABLE 1

Surface treatment conditions of example 1–6 and comparative Example 1–4

| | Treating conditions using alkali aqueous solution | | | Treating conditions using acid aqueous solution | | |
|---|---|---|---|---|---|---|
| | Concentration (g/l) | Temp. (° C.) | Duration (sec.) | Concentration (g/l) | Temp. (° C.) | Duration (sec.) |
| Example 1, 7 | NaOH 15 | 60 | 15 | H$_2$SO$_4$ 15 | 50 | 15 |
| Example 2, 8 | NaOH 50 | 50 | 10 | H$_2$SO$_4$ 70 | 15 | 5 |
| Example 3, 9 | Na$_2$CO$_3$ 100 | 80 | 3 | HCl 50 | 25 | 10 |
| Example 4, 10 | Na$_2$SiO$_3$ 60 | 45 | 10 | HCl 20 | 45 | 10 |
| Example 5, 11 | Na$_3$PO$_4$ 30 | 45 | 25 | H$_3$PO$_4$ 150 | 30 | 25 |
| Example 6, 12 | KOH 150 | 45 | 5 | HNO$_3$ 50 | 30 | 5 |
| Comparative Ex. 1, 5 | NaOH 50 | 50 | 20 | Treatment omitted | | |
| Comparative Ex. 2, 6 | Treatment omitted | | | H$_2$SO$_4$ 70 | 15 | 5 |
| Comparative Ex. 3, 7 | NaOH 70 | 60 | 15 | CrO$_3$ 50 | 65 | 120 |
| Comparative Ex. 4, 8 | Na$_2$CO$_3$ 70 | 60 | 60 | H$_2$SO$_4$ 100 | 65 | 60 |

TABLE 2

Surface condition and characteristics of Example 1–6 and comparative Example 1–4

| | Condition of formed minute pores | | | Characteristics of can body | | |
|---|---|---|---|---|---|---|
| | Average Diameter (nm) | Maximum depth (nm) | Duty area rate of pores (Specific surface area increase rate) | | A | B | C |
| Example 1 | 800 | 300 | 35% | (11.0%) | ◎ | ◎ | ◎ |
| Example 2 | 400 | 200 | 50% | (18.5%) | ◎ | ◎ | ◎ |
| Example 3 | 800 | 400 | 30% | (7.0%) | ○ | ○ | ○ |
| Example 4 | 1000 | 500 | 70% | (25.0%) | ○ | ○ | ○ |

TABLE 2-continued

Surface condition and characteristics of Example 1–6 and comparative Example 1–4

| | Condition of formed minute pores | | | Characteristics of can body | | |
|---|---|---|---|---|---|---|
| | Average Diameter (nm) | Maximum depth (nm) | Duty area rate of pores (Specific surface area increase rate) | A | B | C |
| Example 5 | 2500 | 800 | 45% (15.0%) | ◉ | ◉ | ○ |
| Example 6 | 90 | 90 | 12% (3.0%) | ○ | ○ | ○ |
| Comparative EX. 1 | — | 1200 | — (32.0%) | X | X | X |
| Comparative Ex. 2 | 300 | 150 | 7.5% (2.5%) | ○ | Δ | X |
| Comparative Ex. 3 | 1000 | 1800 | 70% (25.0%) | ○ | Δ | Δ |
| Comparative Ex. 4 | 1800 | 1500 | 78% (35.0%) | ○ | Δ | Δ |

TABLE 3

Surface condition and characteristics of Example 7–12 and comparative Example 5–8

| | Condition of formed minute pores | | | Characteristics of can body | | |
|---|---|---|---|---|---|---|
| | Average Diameter (nm) | Maximum depth (nm) | Duty area rate of pores (Specific surface area increase rate) | A | B | C |
| Example 7 | 900 | 350 | 44% (11.5%) | ◉ | ◉ | ◉ |
| Example 8 | 400 | 230 | 55% (19.0%) | ◉ | ◉ | ◉ |
| Example 9 | 13000 | 500 | 30% (9.5%) | ○ | ○ | ○ |
| Example 10 | 1600 | 600 | 78% (30.0%) | ○ | ○ | ○ |
| Example 11 | 2300 | 750 | 50% (12.0%) | ◉ | ◉ | ◉ |
| Example 12 | 150 | 80 | 12% (8.0%) | ○ | ○ | ○ |
| Comparative Ex. 5 | — | 1300 | — (35.5%) | X | X | X |
| Comparative Ex. 6 | 550 | 450 | 9.5% (4.0%) | ○ | Δ | X |
| Comparative Ex. 7 | 1200 | 2000 | 70% (32.0%) | Δ | X | Δ |
| Comparative Ex. 8 | 2000 | 1800 | 75% (32.5%) | ○ | Δ | Δ |

What is claimed is:

1. A thermoplastic polyester resin covered aluminum alloy sheet wherein a thermoplastic polyester resin having a thickness of 5 to 50 microns is laminated on at least one side of an aluminum alloy sheet which is treated by alkali aqueous solution followed by treatment with an acid aqueous solution wherein the specific area increase rate of the aluminum alloy is 3 to 30% and wherein the specific surface area is provided by minute pores formed on the aluminum alloy sheet, the diameter of the pores being in the range of 50 to 3000 nm, the maximum depth of the pores being 1000 nm or less, and the duty area rate being in the range of 10 to 80%.

2. The thermoplastic polyester resin covered aluminum alloy sheet according to claim 1, wherein the average diameter of said minute pores is in the range of 200 to 900 nm, the depth of said pores is shallower than half the average diameter of said pores, and said pores extend in the thickness direction from the surface of said aluminum alloy sheet.

3. The thermoplastic polyester resin covered aluminum alloy sheet according to claim 1 wherein said polyester resin is selected from the group consisting of polyethylene terephthalate, a copolyester resin mainly composed of ethylene terephthalate units, a copolyester mainly composed of butylene terephthalate units, and blends thereof, and a multi-layered resin film selected from the group consisting of polyethylene terephthalate, a copolyester resin mainly composed of ethylene terephthalate units, a copolyester mainly composed of butylenes terephthalate units, and blends thereof.

* * * * *